(12) United States Patent
Kuo

(10) Patent No.: US 6,810,030 B1
(45) Date of Patent: Oct. 26, 2004

(54) DYNAMIC AND SMART SPREADING FOR WIDEBAND CDMA

(75) Inventor: Wen-Yi Kuo, Parsippany, NJ (US)

(73) Assignee: Lucent Technology, Murray Hill, NJ (US)

(*) Notice: Subject to any disclaimer, the term of this patent is extended or adjusted under 35 U.S.C. 154(b) by 0 days.

(21) Appl. No.: 08/953,592

(22) Filed: Oct. 17, 1997

(51) Int. Cl.⁷ ............................................. H04B 7/216
(52) U.S. Cl. ...................... 370/335; 370/342; 370/441; 455/452.1
(58) Field of Search .................. 370/203, 310, 370/315, 316, 319, 320, 328, 329, 335, 342, 441, 536, 542, 543, 544; 375/200; 455/415, 2.1, 452.2, 453

(56) References Cited

U.S. PATENT DOCUMENTS

| | | | |
|---|---|---|---|
| 5,062,105 A | * 10/1991 | McKnight et al. | 370/538 |
| 5,210,771 A | 5/1993 | Schaeffer et al. | |
| 5,471,497 A | * 11/1995 | Zehavi | 375/200 |
| 5,479,447 A | * 12/1995 | Chow et al. | 375/260 |
| 5,500,856 A | 3/1996 | Nagase et al. | |
| 5,521,922 A | * 5/1996 | Fujinami et al. | 370/543 |
| 5,586,170 A | * 12/1996 | Lea | 379/60 |
| 5,590,156 A | * 12/1996 | Carney | 375/316 |
| 5,602,833 A | * 2/1997 | Zehavi | 370/209 |
| 5,623,485 A | 4/1997 | Bi | |
| 5,640,385 A | * 6/1997 | Long et al. | 370/335 |
| 5,666,655 A | * 9/1997 | Ishikawa et al. | 455/512 |
| 5,793,757 A | * 8/1998 | Uddenfeldt | 370/335 |
| 5,796,722 A | * 8/1998 | Kotzin et al. | 370/252 |
| 5,896,368 A | * 4/1999 | Dahlman et al. | 370/335 |
| 5,898,927 A | * 4/1999 | Ishii et al. | 455/450 |
| 6,005,893 A | * 12/1999 | Hyll | 375/260 |
| 6,173,007 B1 | * 1/2001 | Odenwalder et al. | 370/145 |

FOREIGN PATENT DOCUMENTS

| EP | 0716514 A1 | 7/1994 |
|---|---|---|
| EP | 0786890 A2 | 1/1997 |

* cited by examiner

*Primary Examiner*—Bob A. Phunkulh

(57) ABSTRACT

A method for allocating utilization of multiple carriers in a wideband CDMA transmission system first determines the carrier utilization/interference levels for each of the multiple carriers. Based on the carrier utilization/interference level, carrier assignments are allocated on an unequal basis. The allocation of the carrier assignment biases the selection of the carriers away from higher utilized/interfered carriers. An apparatus for implementing the method is also described.

27 Claims, 4 Drawing Sheets

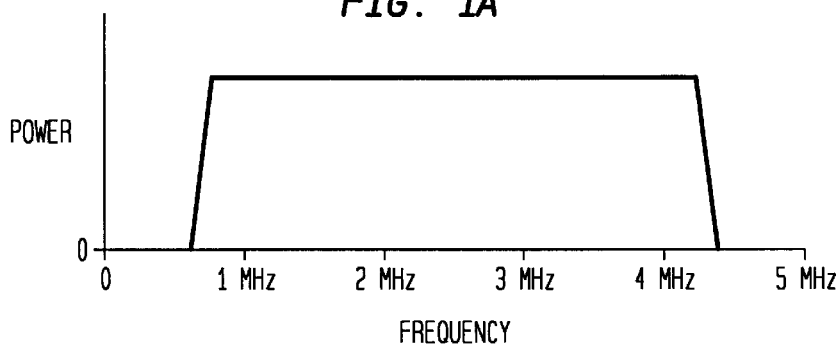
FIG. 1A
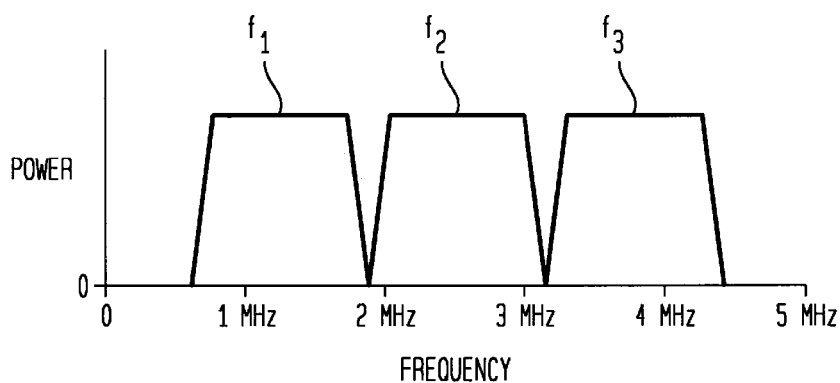
FIG. 1B
FIG. 2
IS-95 + WIDEBAND IS-95 CELL
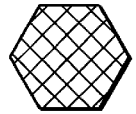
IS-95 CELL
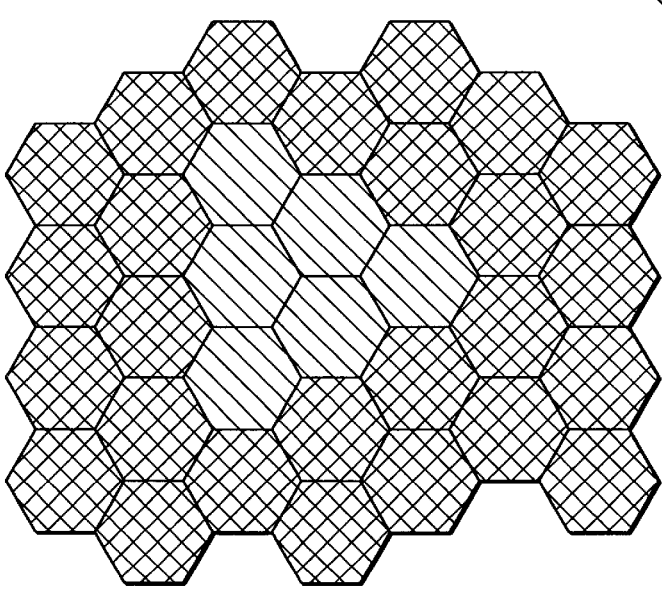

DYNAMIC AND SMART SPREADING FOR WIDEBAND CDMA

FIELD OF THE INVENTION

This invention relates to wireless communications, and more particularly to code division multiple access (CDMA) wireless communications.

BACKGROUND OF THE INVENTION

Wireless communication provides tetherless access to mobile users and addresses the requirements of two specific and disjoint domains: voice telephony and indoor data LANs. Cellular telephone networks have extended the domain of telephone service over a wireless last hop, while mobile-IP LANs such as WaveLAN and RangeLAN do the same for indoor users of TCP/IP data networks. Advances with wireless technology and high-speed integrated service wired networking promises to provide mobile users with comprehensive multimedia information access in the near future. For example, Personal Communication Services (PCS) are a broad range of individualized telecommunication services which enable individuals or devices to communicate irrespective of where they are at anytime. Personal Communication Networks (PCN) are a new type of wireless telephone system communicating via low-power antennas. PCNs offer a digital wireless alternative to the traditional wired line.

The following represent areas of concern in wireless technology, for example, in any wireless communication system, transmitter power has an important impact on system performance. In a noise limited wireless communication system, the transmitted power determines the allowable separation between the transmitter and receiver. The available transmitted power determines the signal-to-noise ratio, which must exceed some prescribed threshold at the receiver input for successful communication of information to occur.

When transmitting a message signal over a communication channel, both analog and digital transmission methods can be used. Digital methods are preferred due to advantages over analog methods, including: increased immunity to channel noise and interference; flexible operation of the system; common format for the transmission of different kinds of message signals; improved security of communications through the use of digital encryption; and increased capacity.

Efficient utilization of bandwidth is another concern. One means of accomplishing effective utilization of available bandwidth is through signal multiplexing, in which signals from several message sources are simultaneously transmitted over a common spectral resource. Frequency division multiplex, time division multiplex, and mixtures have been used for implementing signal multiplexed cellular radio systems.

Another multiple access system involves the use of wideband communications, as opposed to narrowband approaches like frequency division multiple access (FDMA) and time division multiple access (TDMA). In cellular radiotelephone systems such wideband communications have been achieved using code division multiple access (CDMA) spread spectrum techniques. Such spread spectrum systems utilize a modulation technique for spreading the information being communicated over a wide frequency band. This frequency band is typically much wider than the minimum bandwidth required to transmit the information being sent.

In a direct sequence CDMA system, communication between two communication units is accomplished by spreading each transmitted signal over a wide frequency band with a unique user spreading code. This results in a plurality of transmitted signals sharing the same frequency. The ability of such a system to work is based on the fact that each signal is specially time and/or frequency coded to permit its separation and reconstruction at the receiver. Particular transmitted signals are retrieved from the communication channel by despreading a signal from all of the signals by using a known user spreading code related to the spreading implemented at the transmitter.

There is a significant investment in spectrum resources and equipment currently supporting narrowband CDMA. When a wideband CDMA (W-CDMA) system which utilizes several carriers is overlaid on IS-95 carrier(s) there is a capacity loss. In general, any unbalanced interference and unbalanced loading across carriers will degrade the aggregate capacity.

SUMMARY OF THE INVENTION

The present invention is a method for allocating utilization of multiple carriers in a wideband CDMA transmission system. The method first determines the carrier utilization/interference levels for each of the multiple carriers. Based on the carrier utilization/interference level, carrier assignments are allocated on an unequal basis. The allocation of the carrier assignment biases the selection of the carriers away from higher utilized/interfered carriers. An apparatus for implementing the method is also described.

BRIEF DESCRIPTION OF THE DRAWINGS

A more complete understanding of the present invention may be obtained from consideration of the following description in conjunction with the drawings in which:

FIG. 1A is a representative spectrum for a direct spread forward link;

FIG. 1B is a representative three carrier forward link method for W-CDMA;

FIG. 2 is a typical cell layout which mixes W-CDMA cells with IS-95 cells;

DETAILED DESCRIPTION OF VARIOUS ILLUSTRATIVE EMBODIMENTS

Figure 3:
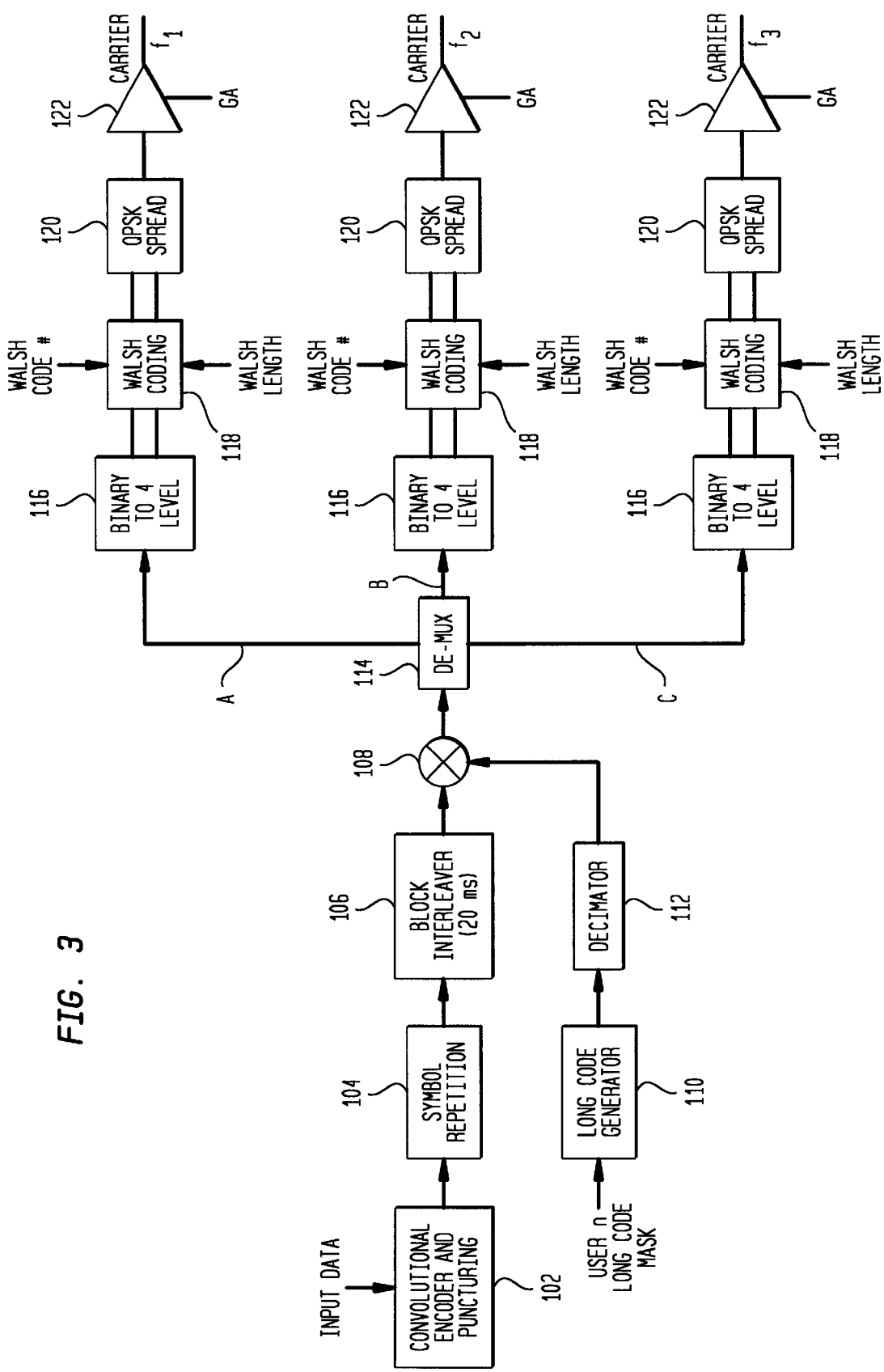
FIG. 3 is a block diagram of a three carrier forward link.

Although the present invention is particularly well suited for a multi-carrier W-CDMA system, such as a three carrier W-CDMA system and shall be so described, the present invention is equally well suited for use with other multiple band carrier systems.

CDMA modulation techniques have been employed in communication systems to permit a large number of users to communicate with one another. In a CDMA communication system, all communication channels are multiplexed into one or several common broadband frequencies. Each channel is differentiated by a unique spreading code. Prior to transmission, each information signal is modulated with a spreading code to convert the information signal into a broadband signal. A receiver demodulates the received broadband signal by combining the broadband signal with the corresponding spreading code to recover the information signal. The spreading code is typically a binary code. Since the same wideband is available to all users, information signals in other channels may appear as co-channel interference or noise when the received signal is demodulated by the spreading code.

Several alternative Wideband CDMA (W-CDMA) systems which are compatible with IS-95 are currently being proposed for widespread implementation. One proposal uses in the forward link 3 parallel 1.25 MHz carriers and spreads the encoded bits uniformly over the 3 carriers for frequency diversity. However, spreading uniformly over 3 carriers with overlaid IS-95 carrier(s) will cause some capacity loss. In general, any known unbalanced interference and unbalanced loading across carriers will degrade the aggregate capacity. The present invention uses dynamic and smart (non-uniform) spreading to achieve maximum capacity in the co-existence systems or systems with unbalanced interference across carriers. By using dynamic and smart spreading, the present invention provides improved capacity over uniform spreading, in particular for the following conditions: W-CDMA overlaid with IS-95 carrier(s); avoidance for some frequencies due to microwave usage or any known jammer(s); and any deterministic or statistical difference of interference across different carriers.

Referring to FIG. 1A, there is shown a representative spectrum for a direct spread forward link which is contrasted with a single wideband forward link. FIG. 1B shows a representative multi-carrier forward link method for W-CDMA systems which is compatible with IS-95 (CDMA One) which employs 3 parallel 1.25 MHz carriers ($f_1$, $f_2$ and $f_3$) and spreads the encoded bits equally over the 3 carriers for frequency diversity.

Referring to FIG. 2, there is shows a cell layout which mixes W-CDMA cells with IS-95 cells to provide high rate data coverage. An advantage to multi-carrier forward link for W-CDMA is that the capacity is less impacted in overlaid systems with IS-95. This is because the orthogonality in the forward link can be maintained for the overlaid systems. Otherwise, as with direct spreading, the W-CDMA and the IS-95 will be interfering each other and has significant loss in capacity. However, even though the orthogonality is maintained in the multi-carrier forward link for the overlaid carrier, the forward link capacity is not utilized efficiently.

For example, assume W-CDMA is deployed in $f_1+f_2+f_3$ and is overlaid with IS-95 in $f_1$. For the uniform spread method, bits are uniformly spread into the carriers and therefore the power usage at each carrier for one specific user must be the same, due to the fact that power control is based on frame errors and each frame's bits are uniformly spread into the carriers. The net effect is that the uniform spread method will have larger aggregate power usage in $f_1$ than in $f_2$ and $f_3$ because of the narrow-band (IS-95) usage in $f_1$. The associated interference in $f_1$ will then be larger and effectively cost more power per user to maintain the required signal to interference ratio. On the other hand, the smart spread method assigns more bits per user into the carriers with less interference and less loading so that the associated interference in each carrier is roughly equalized in order to save the power per user and maximize the potential capacity.

In IS-95 a forward link does not have fast power control while the W-CDMA system described above has fast forward power control. This means the forward power consumption in IS-95 is much less efficient than in W-CDMA. Only a few users in IS-95 can easily use up a large portion of the forward loading capacity due to power control deficiency as well as other deployment issues (like multiple pilots area). Therefore blocking in the overlaid system can occur prematurely if W-CDMA does not utilize the remaining power efficiently. While it can be argued that if all three carriers are equipped with IS-95, then the loading balance can be solved, by the time W-CDMA is introduced, it would not be practical to have operators install additional IS-95 systems for this purpose.

Furthermore, if there are known forward link jammers in some cell area, such as microwave users that the system operator can not afford to mitigate, or more generally, if there exists a deterministic or statistical difference of interference across W-CDMA frequencies due to difficulty in spectrum clearance, similar inefficient loading/capacity usage will occur. Blocking will occur in the system before the designed traffic load.

In order to address this kind of unbalanced issue, the present invention utilizes dynamic and smart spreading over the W-CDMA frequencies. Smart spreading means that unequal spreading should be based on the knowledge of the wireless channels to achieve the goal of maximum utilization of potential capacity by equalizing the loading and interference across the carriers. The fundamental idea is to spread a different amount of encoded bits (i.e., non-uniformly) to different carriers such that power usage on different carriers can be different for the same user. The per bit energy is still regulated by the power control within each carrier such that error performance can be maintained roughly the same. In this way, the loading can be easily utilized to its full capacity in spite of any unbalance across the operating carriers.

Referring to FIG. 3, there is shown a block diagram of the multi-carrier forward link. Input data is coupled to a convolutional encoder and puncturing system 102. The output of the convolutional encoder and puncturing system 102 is coupled to a symbol repetition system 104. The output of the symbol repetition system 104 is coupled to a block interleaver (20 ms) 106. A user n long code mask is coupled to a long code generator 110. The output of the long code generator 110 is coupled to a decimator 112. The output of the block interleaver 106 and the output of the decimator 112 are coupled to a multiplier 108. The output of the multiplier 108 is coupled to a de-multiplexer 114. In the case of a three carrier W-CDMA system, the de-multiplexer 114 has three outputs A, B and C, where each output A, B and C is coupled to a corresponding binary to 4 level circuit 116. The output of the binary to 4 level circuit 116, the Walsh Code # and the Walsh Length are coupled to a corresponding Walsh Coding circuit 118. The output of the Walsh Coding circuit 118 is coupled to a corresponding QPSK spread circuit 120. The output of the QPSK spread circuit 120 is coupled to a corresponding RF amplifier 122 which produces a corresponding carrier $f_1$, $f_2$ or $f_3$.

Figure 4:
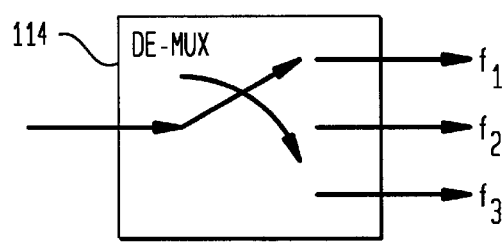
FIG. 4 is a diagrammatic representation of the spreading of the de-multiplexer for uniform spreading.

FIG. 4 shows a diagrammatic representation of the spreading of the de-multiplexer 114 where all encoded bits are uniformly spread into 3 carriers. In other words, the spreading is allocated equally across the three frequencies, such as $f_1$, $f_2$, $f_3$, $f_1$, $f_2$, $f_3$, $f_1$, $f_2$, $f_3$ ... or $f_3$, $f_2$, $f_1$, $f_3$, $f_2$, $f_1$, $f_3$, $f_2$, $f_1$ ... etc.

Figure 5:
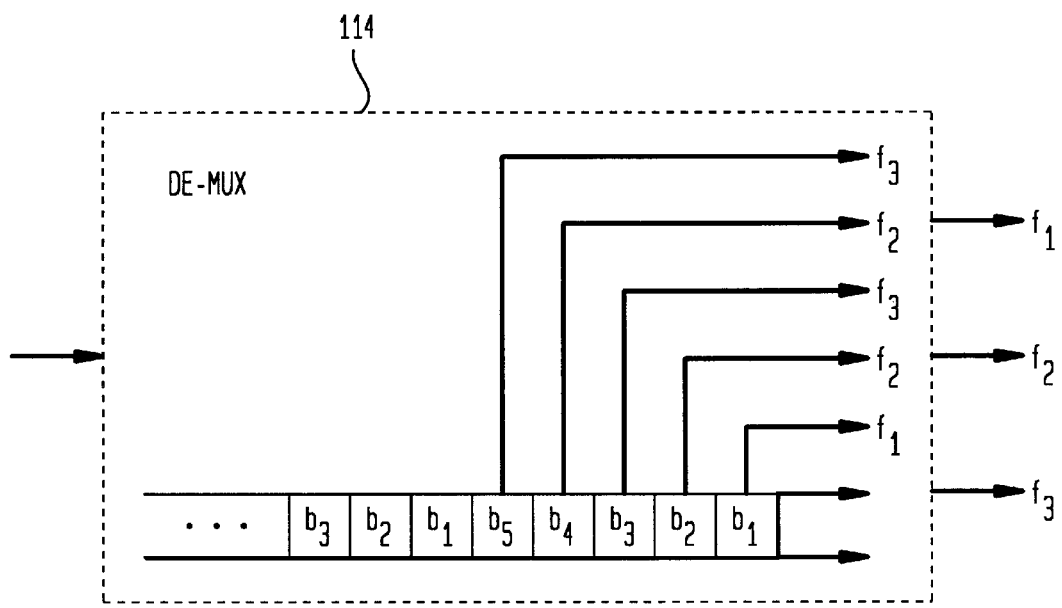
FIG. 5 is a diagrammatic representation of an example of the unequal spreading of the de-multiplexer.

FIG. 5 shows a diagrammatic representation of an example of the unequal spreading of the de-multiplexer 114 of the present invention. This example shows an implementation of a spreading ratio of 1:2:2 for $f_1:f_2:f_3$. In other words the spreading is allocated unequally across the three frequencies, such as $f_1, f_2, f_3, f_2, f_3, f_1, f_2, f_3, f_2, f_3 \ldots$ or $f_3, f_2, f_1, f_3, f_2, f_3, f_2, f_1, f_3, f_2 \ldots$ etc. The change is only in the de-multiplex function. For framed data structure, padding may be used to fit in the transmit stream. The spreading ratio depends on the loading and other unbalanced knowledge across carriers. Smart spreading refers to an algorithm to assign different spreading ratios to different users to achieve the goal of load balance.

Figure 6:
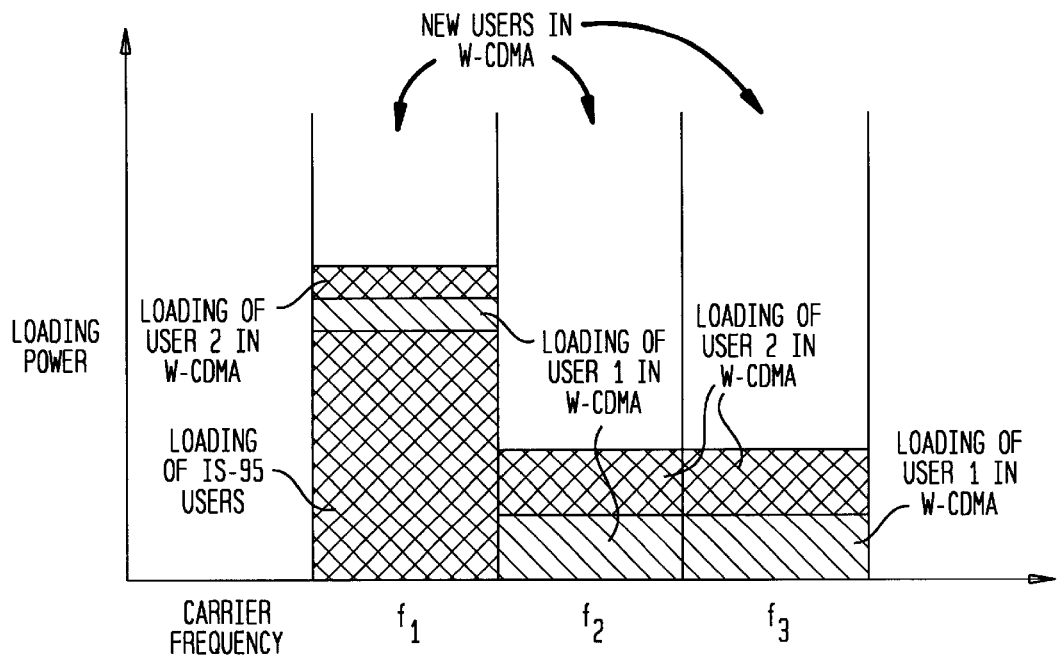
FIG. 6 is a graphical representation of the loading utilization across three carrier frequencies with smart spreading in the forward link.

Referring to FIG. 6 there is shown a graphical representation of the loading utilization across three carrier frequencies with smart spreading in the forward link. In this particular representative embodiment carrier $f_1$ is loaded by IS-95 users while $f_2$ and $f_3$ do not have IS-95 users. Two W-CDMA users are shown in the loading. User 1 was assigned a spreading ratio of 1:2:2 for $f_1:f_2:f_3$. In other words the spreading for User 1 is allocated unequally across the three frequencies, such as $f_1, f_2, f_3, f_2, f_3, f_1, f_2, f_3, f_2, f_3 \ldots$ When an additional user, User 2, comes on, carrier $f_1$ still has a higher utilization and interference than carrier $f_2$ or carrier $f_3$. Therefore, the allocation is continued to be biased towards carrier f2 and carrier f3 over carrier $f_1$. User 2 was assigned a spreading ratio of 1:2:2 for $f_1:f_2:f_3$. In other words the spreading for User 2 is allocated unequally across the three frequencies, such as $f_1, f_2, f_3, f_2, f_3, f_1, f_2, f_3, f_2, f_3 \ldots$. An unequally continues for additional users with the selection being biased away from the carrier frequency that has a higher utilization and interference. The allocation can also shift to an equal allocation as the utilization balances out amongst the carrier frequencies. Further, the allocation is biased to compensate for the loading caused by known jammers as well as any deterministic or statistical difference of interference across the different carriers.

In practice, the air interface should provide the flexibility to change the spreading ratio by sending a message from base stations to mobile stations (terminals). The channel assignment message and the like are the candidates to accomplish sending this message. The message should be able to specify in details which Walsh channels are going to be used in each carrier and the spreading ratios across the carriers. Dynamic spreading refers to changing spreading ratios of a particular user over time due to environmental variations such as moving in or out of the jammer zone, etc. The proposed method will require the terminal (mobile unit) for W-CDMA to do more buffering due to the unequal spreading across carriers.

The method described above works for forward link. However, there are significant reasons for improving the forward link first. In high speed data transmission for which W-CDMA is aimed for, downloading data from Internet has been recognized as the dominant traffic demand. Forward link usage is expected to be higher than reverse link. In 13K IS-95 practice, it has been well known that the forward link is the bottleneck in terms of capacity. Again, slow power control and less coding gain are major factors. Even if EVRC (8K) is deployed later, it is still possible (depending on locations) that the forward link will be the limiting link for capacity due to deployment constraints where multiple dominant pilots are prevalent.

Nevertheless, after improving the forward link capacity, the capacity bottleneck in the reverse link will come into effect. For similar reasons previously described, the terminal (mobile unit) can also adopt the smart spreading method such that efficient loading utilization in the reverse link can be achieved. A simple way for different spreading in reverse link is to have the terminal (mobile unit) have the ability to transmit a signal in one of two forms, either a 3*1.25 MHz (3.75 MHz) carrier or in any of a single 1.25 MHz carrier. In other words, a terminal should be able to spread with a higher chip rate (3.75 MHz) and also with the lower rate option (1.25 MHz).

Figure 7:
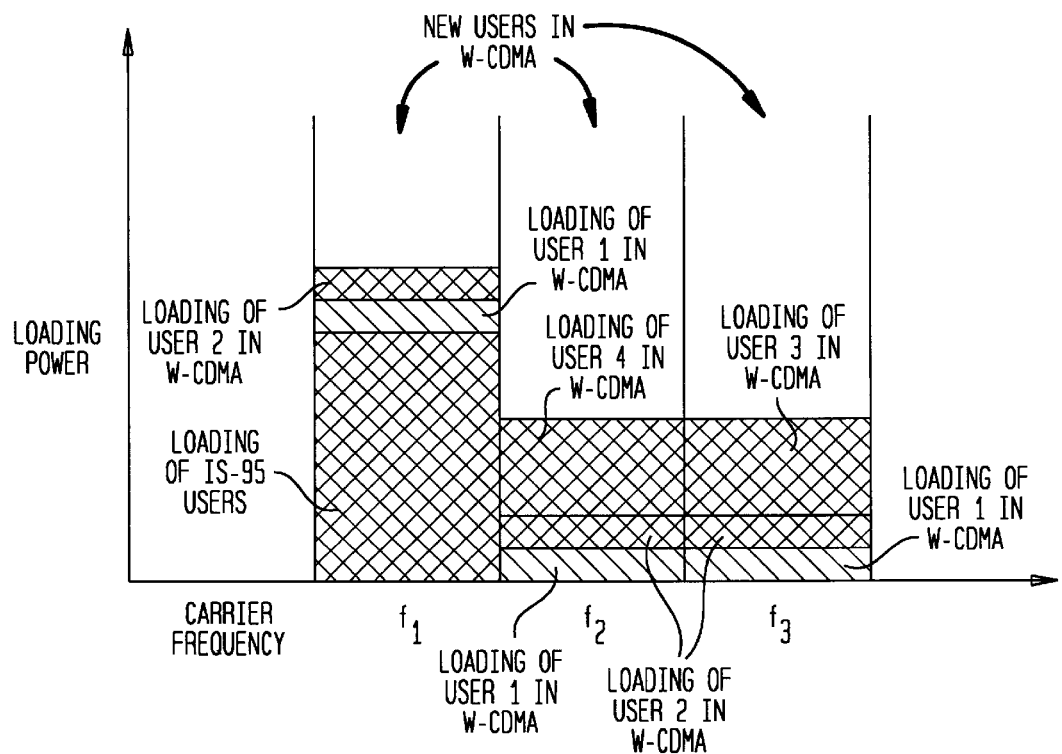
FIG. 7 is a graphical representation of the loading utilization across three carrier frequencies with smart spreading in the reverse link.

Referring to FIG. 7 there is shown a graphical representation of the loading utilization across three carrier frequencies with smart spreading in the reverse link. In this particular representative embodiment carrier $f_1$ is loaded by IS-95 users while $f_2$ and $f_3$ do not have IS-95 users. Four W-CDMA users are shown in the loading. User 1 was assigned to transmit on a single 3*f(3*1.25 mhz) signal which results in equal loading of carriers $f_1, f_2$ and $f_3$. User 2 was assigned to transmit on a single 3*f(3*1.25 mhz) signal which results in equal loading of carriers $f_1, f_2$ and $f_3$. User 3 was assigned to transmit at the lower rate option on only carrier $f_3$. User 4 was assigned to transmit at the lower rate option on only carrier $f_4$. An unequal allocation can continue for additional users with the selection being biased away from the carrier frequency that has a higher utilization and interference. The allocation can also shift to an equal allocation as the utilization balances out amongst the carrier frequencies. Further, the allocation is biased to compensate for the loading caused by known jammers as well as any deterministic or statistical difference of interference across the different carriers.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A method for allocating loading of multiple carriers in a wideband CDMA transmission system comprising the steps of:

determining carrier interference for each of the multiple carriers; and allocating encoded bits of a user to the multiple carriers, an amount of the encoded bits allocated to each carrier based in part upon said determined interference.

2. The method of claim 1 further including the steps of:

determining carrier utilization for each of the multiple carriers; and said allocating step further being based in part upon said determined utilization.

3. The method of claim 1 wherein said allocating step includes providing at least one spreading ratio for a user.

4. The method of claim 1 wherein said carriers can be implemented in non-wideband CDMA systems.

5. The method as recited in claim 1 wherein the step of determining carrier interference further includes determining loading caused by known jammers.

6. The method as recited in claim 1 wherein the step of determining carrier interference further includes determining any deterministic difference of interference across the multiple carriers.

7. The method as recited in claim 2 wherein the step of determining carrier utilization further includes determining wideband CDMA carrier utilization of the multiple carriers.

8. The method as recited in claim 1 wherein the step of determining carrier interference is dynamic in reaction to environmental variations.

9. The method as recited in claim 2 wherein the step of determining carrier utilization is dynamic in reaction to loading variations.

10. The method as recited in claim 1 wherein the allocation of said carrier assignment biases selection of carriers away from carriers with higher interference.

11. The method as recited in claim 2 wherein the allocation of said carrier assignment biases selection of carriers away from carriers with higher interference.

12. An apparatus for allocating utilization of multiple carriers in a wideband CDMA transmission system comprising:
   means for determining carrier interference for each of the multiple carriers; and
   a de-multiplexer adapted to allocate different portions of at least one transmitted signal into a plurality of the multiple carriers based in part upon the determined interference.

13. The apparatus of claim 12 further including means for determining carrier utilization for each of the multiple carriers; and said de-multiplexer further being based in part upon said determined utilization.

14. The apparatus is recited in claim 12 wherein the means for determining carrier interference further includes means for determining loading caused by known jammers.

15. The apparatus as recited in claim 12 wherein the means for determining carrier interference further includes means for determining any deterministic difference of interference across the multiple carriers.

16. The apparatus as recited in claim 13 wherein said utilization determining means determines wideband CDMA carrier utilization of the multiple carriers.

17. The apparatus as recited in claim 12 wherein the means for determining carrier interference is dynamic in reaction to environmental variations.

18. The apparatus as recited in claim 13 wherein the means for determining carrier utilization is dynamic in reaction to loading variations.

19. The apparatus as recited in claim 12 wherein the allocation of said carrier assignment biases selection of carriers away from carriers with higher interference.

20. The apparatus as recited in claim 13 wherein the allocation of said carrier assignment biases selection of carriers away from carriers with higher utilization.

21. A method for allocating loading of multiple carriers in a wideband CDMA transmission comprising the steps of:
   determining carrier interference for each of the multiple carriers; and
   de-multiplexing different portions of at least one transmitted signal into different carriers, an amount of the de-multiplexed at least one transmitted signal onto each of the different carriers, based in part upon the determined interference.

22. The method of claim 21 further including the steps of:
   determining carrier utilization for each of the multiple carriers; and
   said allocating step further being based in part upon said determined utilization.

23. A method for allocating loading of multiple carriers in a wideband CDMA transmission comprising the steps of:
   determining carrier utilization/interference for each of the multiple carriers;
   assigning different spreading ratios to different users based upon said determined utilization/interference; and
   allocating different portions of at least one transmitted signal from at least one user into a plurality of the multiple carriers, based upon the spreading ratio assigned to the one user.

24. A method for allocating loading of multiple carriers in a wideband CDMA transmission comprising the steps of:
   determining carrier utilization/interference for each of the multiple carriers; and
   spreading encoded bits of a user non-uniformly into different carriers based upon the determined utilization/interference.

25. The method of claim 24 wherein said encoded bits of said user are spread into different carriers in accordance with a spreading ratio.

26. A method for allocating loading of multiple carriers in a wideband CDMA transmission comprising the steps of:
   determining carrier interference for each of the multiple carriers;
   assigning different spreading ratios to different users based on said determined interference; and
   spreading encoded bits of each of said users into different carriers in accordance with said different spreading ratios.

27. An apparatus for allocating utilization of multiple carriers in a wideband CDMA transmission system comprising:
   means for determining carrier interference for each of the multiple carriers;
   means for determining carrier utilization for each of the multiple carriers; and
   a de-multiplexer for spreading different amounts of encoded bits for a user to different carriers such that power usage on said different carriers can be different for the same user;
   wherein said different amounts of said encoded bits are spread based on said determined carrier interference and carrier utilization.

* * * * *

UNITED STATES PATENT AND TRADEMARK OFFICE
CERTIFICATE OF CORRECTION

PATENT NO. : 6,810,030 B1
DATED : October 26, 2004
INVENTOR(S) : Wen-Yi Kuo

It is certified that error appears in the above-identified patent and that said Letters Patent is hereby corrected as shown below:

<u>Title page,</u>
Item [73], Assignee, delete "Lucent Technology" and insert
-- Lucent Technologies Inc. --

Signed and Sealed this

Eighteenth Day of January, 2005

JON W. DUDAS
*Director of the United States Patent and Trademark Office*